2,987,475
INHIBITING GROWTH OF BACTERIA IN WATER FLOODING PROCESS

Marvin Legator, Modesto, Calif., assignor to Shell Oil Company, a corporation of Delaware
No Drawing. Filed May 26, 1958, Ser. No. 737,525
8 Claims. (Cl. 252—8.55)

The present invention relates to the treatment of waters, particularly those employed for the recovery of petroleum oils from oil-bearing earth formations. More particularly, the invention pertains to a new and novel method for destroying microorganisms or bacteria present in waters employed for the secondary recovery of petroleum oil from formations containing them.

Petroleum oil is generally recovered from oil-bearing earth formations initially as a result of gas pressure, rock pressure, or natural water drive, which forces oil from the formation through one or more producing wells to the surface. As oil production continues, the reservoir energy gradually decreases and finally becomes insufficient to force the oil to the surface, although a considerable amount, and sometimes a major portion of the original quantity, of the oil in the formation still remains therein. To increase the ultimate recovery of the oil, resort is then made to pumping operations, or the like. When the rate of recovery by pumping drops to an uneconomically low level, a further increase in the ultimate recovery of the oil may still be economically effected by the use of secondary recovery techniques, such as water flooding. One of the difficulties which results from the use of water, particularly sewage water, for the secondary recovery of petroleum oils from oil-bearing earth formations by water flooding techniques, resides in that the original permeability of the formation gradually decreases so that excessively high pressures have to be resorted to in order to force the waters into and through the earth formations to push the oil remaining therein to the well or wells drilled into said formation and used for the production, i.e. recovery, of the petroleum oil therefrom.

It has been found that this decline in formation permeability is caused by microorganisms or bacteria which, by their growth and reproduction within the flooding waters, e.g. sewage water, form occluding precipitates which plug the interstices between the particles forming the earth formation, thereby hampering flooding operations, and frequently rendering such water flooding operations prohibitively uneconomical.

The presence of bacteria in flooding waters (or, for that matter, in other waters used in the oil fields, e.g. the water used in the preparation of water-base drilling muds) is also detrimental for another reason. This is particularly true when the bacteria present in the water are of the so-called sulfate-reducing type, because of the role of these bacteria in promoting corrosion of, for example, drill pipe, casing, and other ferruginous materials used by the petroleum industry in its various phases of locating and producing petroleum oil from oil-bearing earth formations.

It is therefore a principal object of the present invention to provide a method for controlling, inhibiting or even totally suppressing the growth and propagation of bacteria in water employed in the petroleum industry, e.g. for the recovery of hydrocarbon oils from oil-bearing formations. It is a further object of the present invention to provide a method for clearing water used in water flooding operations by destroying the microorganisms or bacteria present therein, or at least for the control or inhibition of bacterial growth in water employed in flooding operations for the secondary recovery of oil. Other objects, features and advantages of the present invention will be apparent from the following description read in conjunction with the appended claims.

It has now been discovered that the addition of olefinically unsaturated lower alkyl aldehydes to the water, particularly sewage water, or the like, employed in the petroleum industry for example for use as flooding waters in the secondary recovery of oil or in waters employed for the preparation of drilling muds used for the drilling of wells into oil-bearing formations, and the like, destroys or at least effectively inhibits and therefore controls the growth of bacteria present in such waters without adversely affecting the desired properties thereof. Thus, the use of these olefinically unsaturated lower alkyl aldehydes, even in the minute amounts to be described further below, inhibits growth of microorganisms, e.g. bacteria, to such a degree that the water flooding operations may be continued for long periods of time without affecting to any material degree the original permeability of the oil-bearing earth formation.

The olefinically unsaturated lower alkyl aldehydes particularly contemplated by the present invention are the alpha-methylidine alkanals which may be represented by the following general formula:

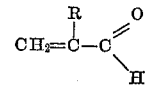

in which R may be hydrogen or a straight chain alkyl radical of not more than five carbon atoms. The invention may therefore be stated to reside in controlling, and even completely inhibiting, the growth of microorganisms of the general class of bacteria, and particularly of the so-called sulfate-reducing bacteria, in water, such as sewage water, which is used in oil wells as well as in oil-bearing formations into which such wells are drilled, said control or substantial or complete inhibition of bacterial growth being effected by the incorporation into said water of minor amounts of the olefinically unsaturated lower alkyl aldehydes represented by the above general formula. In a preferred embodiment of the process of the present invention the aforesaid control and inhibition of bacterial growth is effected by the addition of acrolein to the water, this acrolein being represented by the above formula when R is hydrogen. Another bactericide of considerable value, according to the present invention, is methacrolein, which can be represented by the above formula by placing the methyl group for the R of the formula.

The following data illustrate the fact that the presence of various bacteria in water, used for flooding operations for the purpose of recovering oil from oil-bearing formations, is undesirable and even highly detrimental. As pointed out above, the penetration of flooding water frequently drops almost to zero in a relatively short period of time due to a marked reduction in permeability of the earth formation into which the water is injected. This is clearly due to growth of bacteria. Thus, when flood water is aged for several days, it will frequently show, upon examination, a marked, e.g. a six-fold, increase in its bacterial content. Also, laboratory analyses of sands taken from the walls of water-flood intake wells have indicated the presence of large amounts of bacterial cellular material. While many different species of bacteria may be active in injection waters, most investigators have concluded that the sulfate-reducing bacteria present the greatest problem. These sulfate-reducing microorganisms belong to the genus Desulfovibrio. One of the species is *Desulfovibrio desulfuricans*. Although these bacteria are obligate anaerobes, the presence of aerobic bacterial cells in the water is also detrimental since these aerobes are excellent nutritional source for the anaerobes in the formation.

In a series of tests illustrating the bactericidal activity of acrolein, which is illustrative of the compounds encompassed by the present invention, the growth of the sulfate-reducing bacteria under anaerobic conditions was determined by using test media and test procedure developed by the A.P.I. Mid-Continent district study committee on bactericides. This standardized test media (which is termed the Van Delden's medium includes sodium lactate, yeast, and other food for the bacteria, as well as the compound $Fe(SO_4)_2(NH_4)_2 \cdot 6H_2O$ which acts as a qualitative indicator for sulfide development (because iron sulfide, formed by the sulfate-reducing bacteria, precipitates and causes the media to become blackened). In each of the tests, one cubic centimeter of bacteria-containing flooding water was mixed with from five to ten cubic centimeters of the test media and incubated for 30 days at 37° C. Varied amounts or concentrations of acrolein were used, and water from two different sources was thus anaylzed. In the case of water "A," growth of bacteria (*D. desulfuricans*) was indicated when no acrolein was added, as well as when the concentration of acrolein was equal to 1 p.p.m. However, when acrolein concentrations of 5 p.p.m. or higher were used in the tests, no bacterial development or growth was indicated. Similarly, in the case of water from the second source (indicated at water "B"), there was bacterial growth when acrolein was employed in concentrations as high as 5 p.p.m., but no growth was indicated when concentrations of 10 p.p.m. and higher were used. The results of these tests may be effectively illustrated by the following table in which a plus sign indicates development of bacteria, while a minus sign indicates no bacterial development or growth.

| | Acrolein Concentration in p.p.m. | | | | | | |
|---|---|---|---|---|---|---|---|
| | 0 | 1 | 5 | 10 | 15 | 25 | 50 |
| Water "A" | + | + | − | − | − | − | − |
| Water "B" | + | + | + | − | − | − | − |

This table clearly indicates the effectiveness of the process of the present invention in controlling the growth of bacteria, particularly sulfate-reducing bacteria, in waters which would be or are used in flooding operations to effect secondary recovery of oil from oil-bearing formations.

Although the ability of a given bactericide to inhibit bacterial growth under aerobic conditions is of a relatively secondary importance in the case of water used in water flooding operations to recover oil from oil-bearing formations, the following tests were conducted with the above water "A" to determine the effectiveness of acrolein in controlling aerobic growth of bacteria present in such water.

It is well knew that water, e.g. sewage water, which is to be employed as a flood water has to be frequently filtered in order to prevent different solid matter from being forced down through the input well and from clogging the formation. Although there are some known bactericides which may be effective to a greater or lesser degree in controlling growth of bacteria in waters of the type to be treated according to the process of the present invention, one of the objections to the use of these bactericides is that they increase the tendency of the filter media to become oil wet and to have an increased resistance to the flow of water. An example of such a compound is a N-long-chain-alkyl propylene diamine-1,3. Since it is known that non-ionic surfactants, e.g. alkyl aryl polyglycol ethers can and frequently do overcome the above disadvantages, the effectiveness of the above long-chain diamine (employed in a concentration of 10 p.p.m.) as an anaerobic bactericide was tested in the presence of an alkyl phenol polyethoxy ethanol (known as Triton X-100) used in amounts varying from zero to 25 p.p.m. As will be shown in the next table, it was found that, under these conditions, the diamine was not effective as a bactericide. Simultaneously, in a parallel set of examples, the anaerobic bactericidal properties of 10 p.p.m. of acrolein was tested under the same conditions in the presence of the same diamine. The results are set forth in the following table:

| | Concentration of Non-Ionic Surfactant (in p.p.m.) | | | | | |
|---|---|---|---|---|---|---|
| | 0 | 0.1 | 1 | 5 | 10 | 20 |
| Water "B"+10 p.p.m. of acrolein | + | − | − | − | − | − |
| Water "B"+10 p.p.m. of above alkyl diamine | + | + | + | + | + | + |

The plus signs indicate continued growth of bacteria (and therefore ineffectiveness of the bactericide), while minus signs indicate bacteria growth control or cessation.

In a still another series of tests, the effectiveness of acrolein against anaerobic bacteria was further substantiated. In each of these tests standard soil dilution plates were prepared in the following manner:

(a) One gram of soil was shaken with 100 cc. of water;
(b) One ml. of the resulting suspension was then added to a series of Petri plates;
(c) Various concentrations of acrolein were added to Emerson's agar which in turn was dispensed in 10 cc. amounts on the plates containing the soil suspension;
(d) Anaerobic conditions were achieved by the use of Spray's method; and
(e) The plates were incubated at 37° C. for 7 days.

The following results were found:

| Acrolein concentration (in p.p.m.) | No. of anaerobic colonies present |
|---|---|
| 0 | 260 |
| 10 | 104 |
| 20 | 0 |
| 40 | 0 |
| 80 | 0 |
| 100 | 0 |
| 150 | 0 |
| 200 | 0 |

This table clearly indicates the effectiveness of acrolein in controlling a mixed population of anaerobic bacteria.

Other olefinically unsaturated aldehydes including methacrolein, encompassed by the present invention also possess significant activity when employed as bactericide, particularly in flood waters.

The quantity of bactericide employed may vary within very wide limits, but, in general, should not be less than 1 p.p.m., nor, for practical purposes, exceed 10,000 p.p.m. An optimum quantity for most cases is approximately between 10 p.p.m. and 50 p.p.m. The effective concentration of the bactericide is, in a sense, dependent upon the period of exposures. It will be understood, however, that the quantity or concentration of the bactericide employed and the effective control obtained by it may vary greatly without departing from the scope of the invention. Generally speaking, it is preferable to employ the bactericide of the present invention in such a concentration that the bacteria will be killed (or their growth properly controlled) in the shortest possible time.

I claim as my invention:

1. The method of inhibiting growth of sulfate-reducing bacteria in water employed for flooding an oil-bearing formation to effect oil recovery therefrom, comprising the step of introducing into said bacteria-containing water a bactericidal quantity of a compound having the general structural formula:

wherein R is selected from the class consisting of hydrogen and straight chain alkyl radicals having not more than five carbon atoms.

2. The method of claim 1, wherein the compound is acrolein.

3. The method of claim 1, wherein the bactericidal compound is incorporated into the water in a concentration of between about 1 and 10,000 p.p.m.

4. In a flooding method for recovery of petroleum from an oil-bearing earth formation by injection of water through an input well to said formation, which takes place in the presence of anaerobic bacteria, the improvement comprising admixing with said water between 1 and 10,000 p.p.m. (based on the water) of acrolein thereby inhibiting growth of the bacteria therein.

5. The method according to claim 4, wherein the anaerobic bacteria in the water include the sulfate-reducing bacteria.

6. The method according to claim 4, wherein the anaerobic bacteria in the water include the sulfate-reducing bacteria of the genus Desulfovibrio.

7. A method for recovering petroleum from an oil-bering earth formation taking place in the presence of anaerobic bacteria, which comprises introducing acrolein into bacteria-contaminated water in a concentration of between 1 and 10,000 p.p.m., based on the water, thereby inhibiting growth of bacteria therein, and introducing said treated water through an input well into the oil-bearing formation to displace portions of the oil therein toward a producing well.

8. The method according to claim 7, wherein the bacteria in the water include the sulfate-reducing bacteria, and wherein the concentration of the acrolein is between 10 and 50 p.p.m.

References Cited in the file of this patent

UNITED STATES PATENTS

| 2,692,231 | Stayner et al. | Oct. 19, 1954 |
| 2,733,206 | Prusick et al. | Jan. 31, 1956 |
| 2,801,216 | Yoder et al. | July 30, 1957 |
| 2,839,467 | Hutchison et al. | July 17, 1958 |
| 2,882,227 | Lindberg | Apr. 14, 1959 |

OTHER REFERENCES

Stack: Toxicity of Alpha Beta-Unsaturated Carbonyl to Microorganisms, article in Ind. and Eng. Chem., vol. 49, No. 5, May 1957, pages 913 to 917.

Vollrath et al.: Bactericidal Properties of Acrolein, Proceedings Society for Experimental Biology and Medicine, 1937, vol. 36, pages 55 to 58.